(12) United States Patent
Sorokin

(10) Patent No.: US 9,420,672 B2
(45) Date of Patent: Aug. 16, 2016

(54) MANAGING ATMOSPHERE PROGRAMS FOR ATMOSPHERE CREATION SYSTEMS

(75) Inventor: Mikhail V. Sorokin, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 97 days.

(21) Appl. No.: 13/387,372

(22) PCT Filed: Jul. 21, 2010

(86) PCT No.: PCT/IB2010/053315
§ 371 (c)(1),
(2), (4) Date: Jan. 27, 2012

(87) PCT Pub. No.: WO2011/013035
PCT Pub. Date: Feb. 3, 2011

(65) Prior Publication Data
US 2012/0131099 A1 May 24, 2012

(30) Foreign Application Priority Data
Jul. 29, 2009 (EP) .................................... 09166752

(51) Int. Cl.
*G06F 15/16* (2006.01)
*H05B 37/02* (2006.01)
(Continued)

(52) U.S. Cl.
CPC ........ *H05B 37/029* (2013.01); *G06F 17/30265* (2013.01); *H04N 5/64* (2013.01);
(Continued)

(58) Field of Classification Search
CPC . G06F 15/16; G06F 15/177; G06F 17/30265; A63J 17/00; H05B 37/029; H05B 37/0236; H04N 5/64; H04N 21/4131; H04N 21/436; H04N 21/44008

USPC ........................................................ 709/203
See application file for complete search history.

(56) References Cited

U.S. PATENT DOCUMENTS 6,466,234 B1 10/2002 Pyle et al.
2004/0003073 A1* 1/2004 Krzyzanowski et al. ..... 709/223
(Continued)

FOREIGN PATENT DOCUMENTS

CN  1759386 A  4/2006
CN  101466181 A  6/2009
(Continued)

OTHER PUBLICATIONS

Mols, B., "For sale: mood Tuscany for you living room", pp. 1-6, 2009, highlighted portions.
(Continued)

*Primary Examiner* — Richard G Keehn
*Assistant Examiner* — Mohammed Ahmed
(74) *Attorney, Agent, or Firm* — Meenakshy Chakravorty

(57) ABSTRACT

The invention relates to the management of atmosphere programs including lighting scenes for lighting systems, audio, video, scent or any combination of the above, particularly to a user interface for comfortably selecting an atmosphere program to be created by an atmosphere creation system. A basic idea of the invention is to provide a central control of atmosphere programs together with the possibility of interactively selecting an atmosphere program to be activated locally with an atmosphere creation system. This is particularly useful for large retail chains, which for example require a uniform lighting atmosphere in all chain shops and want to provide their shop personal to comfortably select among a predefined set of lighting scenes in an comfortable way. An embodiment of the invention relates to an atmosphere program management system (10) comprising a server (12), which is remotely accessible via a data connection and stores atmosphere programs and a remote management client (14) for accessing the server and providing a user interface for managing the atmosphere programs stored by the server.

12 Claims, 3 Drawing Sheets

(51) Int. Cl.
*H04N 21/436* (2011.01)
*H04N 5/64* (2006.01)
*H04N 21/41* (2011.01)
*G06F 17/30* (2006.01)
*H04N 21/44* (2011.01)
*A63J 17/00* (2006.01)

(52) U.S. Cl.
CPC ........ *H04N 21/4131* (2013.01); *H04N 21/436* (2013.01); *H04N 21/44008* (2013.01); *H05B 37/0236* (2013.01); *A63J 17/00* (2013.01)

(56) References Cited

U.S. PATENT DOCUMENTS

| | | | | |
|---|---|---|---|---|
| 2005/0097191 | A1* | 5/2005 | Yamaki et al. | 709/219 |
| 2006/0103545 | A1* | 5/2006 | Tsou | 340/825.69 |
| 2006/0200538 | A1* | 9/2006 | Yuh et al. | 709/219 |
| 2006/0284734 | A1* | 12/2006 | Newman, Jr. | 340/825 |
| 2007/0288644 | A1* | 12/2007 | Rojas et al. | 709/230 |
| 2009/0067646 | A1* | 3/2009 | Sato et al. | 381/110 |
| 2010/0030389 | A1* | 2/2010 | Palmer et al. | 700/284 |
| 2010/0049476 | A1* | 2/2010 | Engelen et al. | 703/1 |
| 2010/0090617 | A1* | 4/2010 | Verberkt et al. | 315/297 |
| 2011/0190913 | A1* | 8/2011 | Van De Sluis et al. | 700/94 |

FOREIGN PATENT DOCUMENTS

| | | | | |
|---|---|---|---|---|
| JP | 2006059667 | A | | 3/2006 |
| JP | 2010528413 | A | | 8/2010 |
| WO | 2007050175 | A2 | | 5/2007 |
| WO | WO2008010158 | | * | 1/2008 |
| WO | 2008038188 | A2 | | 4/2008 |
| WO | 2008078286 | A1 | | 7/2008 |
| WO | WO 2008078286 | | * | 7/2008 ............. H05B 37/02 |
| WO | 2008146245 | A1 | | 12/2008 |

OTHER PUBLICATIONS

Osram, "As versatile as your requirements: Simple, functional, flexible: lighting control with easy color control", 2009, pp. 1-12, highlighted portions.

Doorn et al., "End-User software engineering of smart retail environments: The intelligent shop window", pp. 160 onwards.

* cited by examiner

MANAGING ATMOSPHERE PROGRAMS FOR ATMOSPHERE CREATION SYSTEMS

FIELD OF THE INVENTION

The invention relates to the management of atmosphere programs for atmosphere creation systems, particularly to a user interface for comfortably selecting an atmosphere program to be activated by an atmosphere creation system.

BACKGROUND OF THE INVENTION

Atmosphere creation systems allow controlling the creation of lighting, audio, video, scent or any combination thereof particularly in rooms or buildings in order to create a desired atmosphere. Atmosphere programs control the creation of the atmosphere with an atmosphere creation system and comprise control sets for the devices, which are involved in the atmosphere creation, for example the control sets for luminaries of a lighting system, a command for a scent generator for generating a desired scent, a command for an audio/video equipment to play a certain video and sound file. An example of an atmosphere creation system is a lighting system, even if it allows merely controlling of a lighting.

Modern lighting systems enable users to select among different lighting scenes. A lighting scene is a setting of the luminaries of a lighting system for creating a certain lighting atmosphere. Lighting scenes are often used in professional environments such as shops of a retail chain in order to create a uniform lighting atmosphere in all shops. Especially, many branded retail chains are very particular about their brand image and are keen to keep it the same in all the stores in their chain. Part of the brand image is also the lighting atmosphere in a shop. Applying lighting scenes in shops nowadays is facing many challenges like complexity of the controller solutions, not flexible and unfriendly user interfaces, large labour-intense installation and commissioning effort, a lot of effort for troubleshooting, difficult and labour intense scene creation process and high costs of luminaries. Atmosphere creation systems are further challenging than lighting systems, since the number of control- and adjustable parameters is larger. Thus, there exists a need for an easy to use atmosphere program management.

SUMMARY OF THE INVENTION

It is an object of the invention to provide a system and a method for the management of atmosphere programs for atmosphere creation systems, which allow to make management and usage of atmosphere programs easier and more comfortable.

The object is solved by the subject matter of the independent claims. Further embodiments are shown by the dependent claims.

A basic idea of the invention is to provide a central control of atmosphere programs, particularly together with the possibility of interactively selecting an atmosphere program, for example a lighting scene to be created locally with an atmosphere creation system such as a lighting system. This is particularly useful for large retail chains, which require a uniform atmosphere in all chain shops and want to provide their shop personal to select among a predefined set of atmosphere programs in a comfortable way. The invention particularly allows to remotely manage atmosphere programs available for atmosphere creation systems, for example for shops of a retail chain.

An embodiment of the invention provides an atmosphere program management system comprising
- a server, which is remotely accessible via a data connection and stores atmosphere programs and
- a remote management client for accessing the server and providing a user interface for managing the atmosphere programs stored by the server.

The system may further comprise at least one client atmosphere creation system controller for accessing the server and providing a user interface for selecting an atmosphere program to be created with an atmosphere creation system being controlled by the client atmosphere creation system controller. Typically, the server and remote management client are two separate computers on different locations, but they may be also implemented as two separate programs executed by one single computer. The remote management client implements a central/remote user interface, while the client atmosphere creation system controller implements a local user interface. This allows controlling atmosphere program management centrally from a remote computer, and accessing the atmosphere program locally with a client atmosphere creation system controller. For example, shop personnel can use the client atmosphere creation system controllers to create atmospheres in their shop, which are centrally managed from the shop headquarter with the remote management client. Particularly, this embodiment makes management and usage of atmosphere programs easier and more comfortable.

The server may be configured to execute an atmosphere management program, which is adapted to
- remotely display available atmosphere programs stored by the server and to
- allow remotely managing the access to available atmosphere programs by client atmosphere creation system controllers.

The atmosphere management program may be further adapted to load and remotely display a picture associated to an atmosphere program upon selection of the program. This helps users to quickly identify atmospheres and makes atmosphere selection more comfortable.

The atmosphere management program may be yet further adapted to
- remotely display installed atmosphere creation systems and to
- allow remotely assigning an atmosphere program to one or more installed atmosphere creation systems by a "drag and drop" operation. Thus, users may comfortably assign atmosphere programs to different installations of atmosphere creation systems in different shops.

The atmosphere management program may be yet further adapted to
- receive video data from a webcam monitoring an installed atmosphere creation system and to
- remotely display the received video data. This may make the usage of the atmosphere management program more comfortable since users can immediately watch an atmosphere assigned to a local atmosphere creation system, particularly a lighting scene created with a local lighting system as an example of an atmosphere creation system.

The atmosphere management program may be further adapted to allow controlling the webcam. This may help users to better monitor an atmosphere created with an atmosphere creation system.

A client atmosphere creation system controller may be adapted to download a list of accessible atmosphere programs from the server and to display a list with the downloaded accessible atmosphere programs in its user interface for selecting an atmosphere to be created with the atmosphere creation system being controlled by the client atmosphere creation system controller.

A further embodiment of the invention relates to a client atmosphere creation system controller being adapted for application in a system of the invention and as described above.

The controller may be a wireless mobile device, configured by a program for
   providing a user interface for selecting an atmosphere program to be created with an atmosphere creation system being controlled by the client atmosphere creation system controller and
   controlling the atmosphere creation system to create the downloaded atmosphere program. For example, the controller may be a smartphone or PDA (Personal Digital Assistant) executing the program. The user interface provided by the program may be web-based, and the user interface may be dynamically updated, for example by periodically connecting to the server and checking if an updated web-page with atmosphere programs is available. Thus, a user may automatically see only actual atmosphere programs. The controller may be further configured by the program for accessing the server and downloading a selected atmosphere program from the server.

A yet further embodiment of the invention relates to a method for managing atmosphere programs comprising
   remotely displaying available atmosphere programs stored by a server and
   allowing remotely managing the access to available atmosphere programs by client atmosphere creation system controllers.

The method may further comprise one or more of the following:
   loading and remotely displaying a picture associated to an atmosphere program upon selection of the program;
   remotely displaying installed atmosphere creation systems and
   allowing remotely assigning an atmosphere program to one or more installed atmosphere creation systems by a "drag and drop" operation;
   receiving video data from a webcam monitoring an installed atmosphere creation system and remotely displaying the received video data;
   allowing controlling a webcam monitoring an installed atmosphere creation system;
   allowing remotely activating available atmosphere programs on client atmosphere creation system controllers.

An embodiment of the invention provides a computer program enabling a processor to carry out the method according to the invention and as described above.

According to a further embodiment of the invention, a record carrier storing a computer program according to the invention may be provided, for example a CD-ROM, a DVD, a memory card, a diskette, internet memory device or a similar data carrier suitable to store the computer program for optical or electronic access.

A further embodiment of the invention provides a computer programmed to perform a method according to the invention such as a PC (Personal Computer). The computer may be used a central server of a atmosphere management system according to the invention.

These and other aspects of the invention will be apparent from and elucidated with reference to the embodiments described hereinafter.

The invention will be described in more detail hereinafter with reference to exemplary embodiments. However, the invention is not limited to these exemplary embodiments.

DETAILED DESCRIPTION OF EMBODIMENTS

Figure 1:
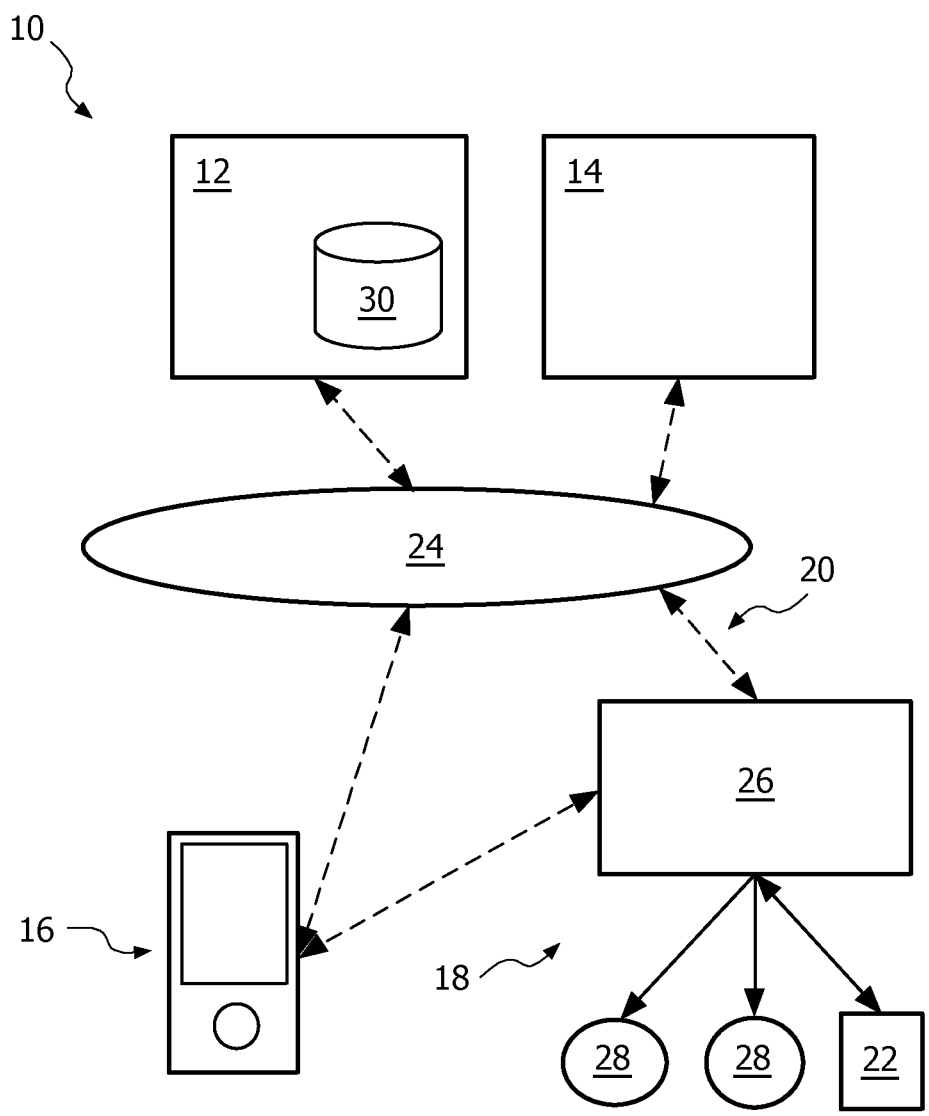
FIG. 1 an embodiment of a lighting scene management system as an example of an atmosphere management system according to the invention.

In the following, functionally similar or identical elements may have the same reference numerals. The terms "light", "lighting unit" and "luminary" relate in the following to the same. In the following, the embodiments of the invention are described by example of a lighting scene management system for a retail chain, which allows a central and comfortable management of lighting scenes available for creating with lighting systems installed in different shops of the retail chain. This allows to create a brand lighting in each shop at a minimum of effort and costs at a maximum of user comfort. Even if the embodiments of the invention as described in the following are related to lighting systems and lighting scene management, the invention is not limited to this application, but may be also applied to any kind of atmosphere creation systems, for example a multifunctional system which is able to create lighting, audio, video, scents, or a system for creating lighting scenes together with sounds, or a system for creating lighting scenes together with scents, or a system for creating lighting scenes together with videos.

FIG. 1 shows a lighting scene management system 10 for shops, which comprises a server 12, a remote management client 14, a client lighting system controller 16, and a lighting system 18 being controlled by the client lighting system controller 16. Only one lighting system 18 is shown as example, but typically several lighting systems of different shops are managed.

The devices 12, 14, and 16 are connected to a packet data network 24 such as the internet and can exchange packet data via a suitable protocol, for example TCP/IP (Transmission Control Protocol/Internet Protocol). A local lighting system controller 26, which is installed in the shop for local control of luminaries 28 installed in the shop, is also connected to the packet data network 24.

The server 12 may be implemented by a standard Personal Computer (PC) executing a webserver program. The server 12 executes a database program 30 storing lighting scenes, i.e. the presets of luminaries of a lighting system for creating lighting scenes. The server 12 also executes a lighting scene management program, which may be implemented as a dynamic website or dedicated program, which is hosted by the webserver program and allows access from any computer executing a webbrowser program. The lighting scene management program has access to the database 30 and allows reading and storing lighting scenes from or in the database 30 via an user interface, which may be created by the dynamic website. The dynamic website also allows client computers to remotely manage the access to available lighting scenes by client lighting system controllers.

A client computer with secure access (for example by using the https protocol) to the managing functions of the lighting scene management program is the remote management client 14, which may be implemented by a PC executing a web-browser program. Alternatively, the client 14 may execute a dedicated remote access program for access to the lighting scene management program executed by the server 12. Upon granted access, the remote management client 14 receives from the lighting scene management program data for displaying a user interface, which allows to remotely manage the lighting scenes stored in the database 30 on the server 12.

Figure 2:
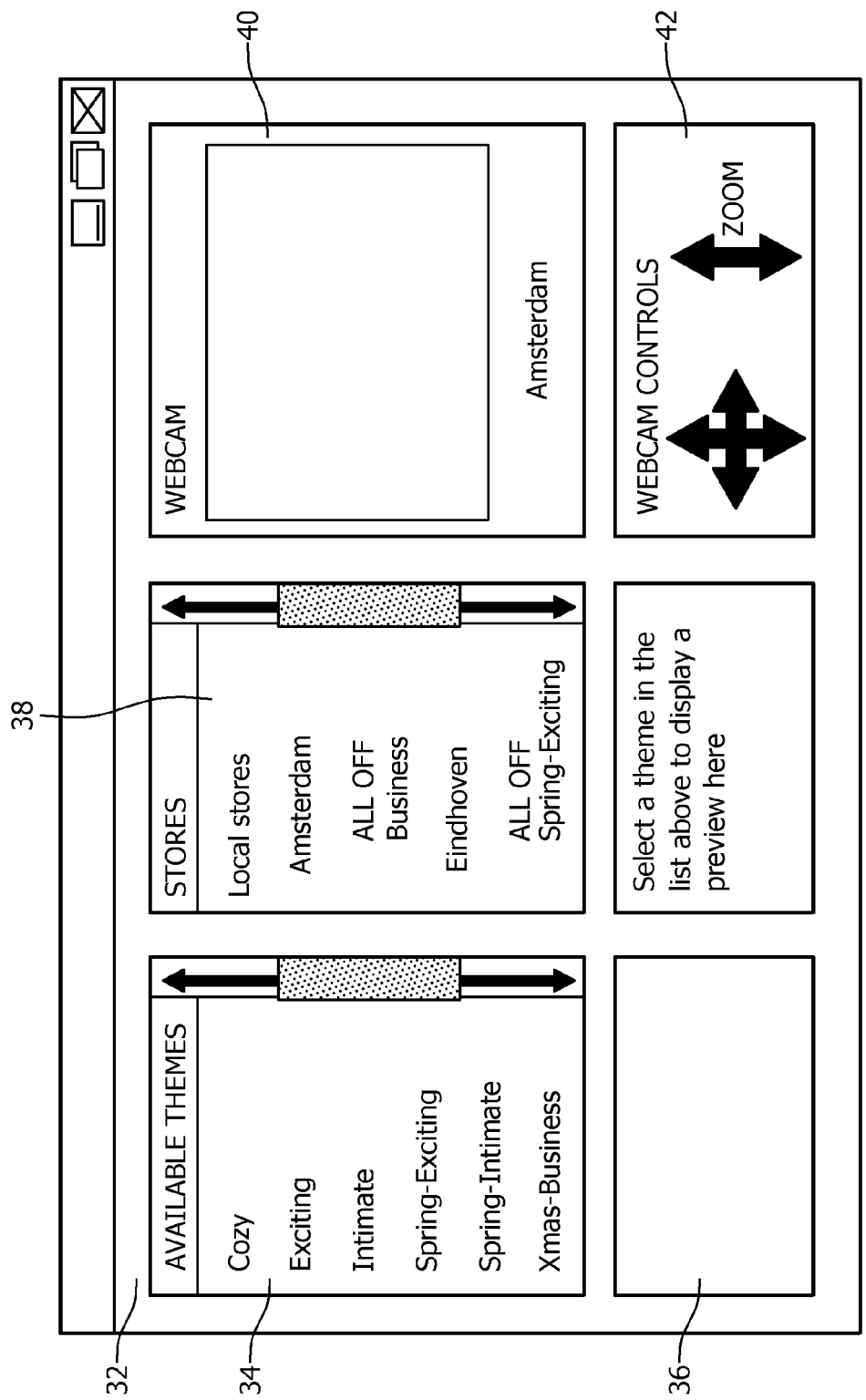
FIG. 2 an embodiment of a user interface of lighting scene management program executed by a server of the lighting scene management system of FIG. 1.

FIG. 2 shows an example of the user interface locally displayed on a monitor of the server 12 or remotely displayed on the remote management client 14. The user interface is displayed in a window 32 of a graphical user interface of the operating system executed by the remote management client 14, for example a window of a webbrowser executed by the remote management client 14. The window 32 comprises a list 34 of available lighting scenes (designated as themes), which allows selection of a desired lighting scene. The lighting scene management program is adapted to load and display a picture associated to a lighting scene upon selection of the scene in the box 36 below the list 34. The picture may be a symbolic icon (like a "red heart" for Valentine) or an example photo of a store with that scene, so that a user may immediately get an impression of the selected lighting scene or theme. A second list 38 shows all stores belonging to the retail chain. The stores shown in list 38 may have access to the lighting scenes stored in the database 30 on the server 12. Access granting can be locally managed on the server 12 or by the remote management client 14 as described in the following: by using the list 38, it may be determined what scenes are available for each of the local stores and every scene can be remotely activated. The remote access-granting can be performed by assigning scenes to the stores by dragging them from the "Available themes" list 32 to the "Stores" list 38 under the relevant store and dropping them there. It is also possible to assign a theme to all the stores by dragging it to the "local stores" entry on top of the list 38. If a theme under a store of list 38 is dragged back to the "Available themes" list 32, it may be removed from the available themes list 38 for that store ("delete" function). The same may happen if the user presses a delete button (not shown) after selecting a theme in one of the local stores in list 38. The list 32 of "Available themes" does not change since the scenes are available for all the stores. Scenes are typically activated by double-clicking (or select-enter) of a scene in the available themes list 38. The user interface may also ask for conformation before activating any of the scenes, in order to prevent accidental changing of lighting in a store and by that possibly create discomfort for the people in the store. Scenes displayed in window 38 do not necessarily have to be limited to the scenes downloaded or downloadable from the server: it may also show the scenes available only for that shop, these scenes may be stored at the local lighting system controller, but also on the server, in this case such scenes may be given a special distinction (e.g. via a symbol, distinctive font or text color) on the list 38 so that it is clear that those scenes are only available for that store.

In one of possible implementations all the lighting scenes may be already known locally in the lighting system 18, for example locally stored in the local lighting controller 26, but not accessible until the access is granted centrally on the server 12. Another option for implementation is that all the scenes are only stored centrally in the database 30 on the server 12, and are only transferred to the local lighting controller 26 when they are enabled.

The lighting scene management program also offers an opportunity to check the effect of scene changing on a web-cam 22, which is installed in a shop and monitors the lighting created by the luminaries 28 of the lighting system 18 of the shop. The window 32 of the user interface comprises a window 40 displaying videodata 20 received from the local lighting controller 26 of the shop, which transmits the videodata 20 via the packet data network 24 to the server 12, which executes the lighting scene management program. A further window 42 provides a full control over the web-cam 42 in the shop, like rotating the web-cam and zooming. Thus, it is possible to remotely supervise the lighting scene created in the shop. The web-cam 22 may alternatively also be directly connected to the server 12 via the packet data network 24.

Figure 3:
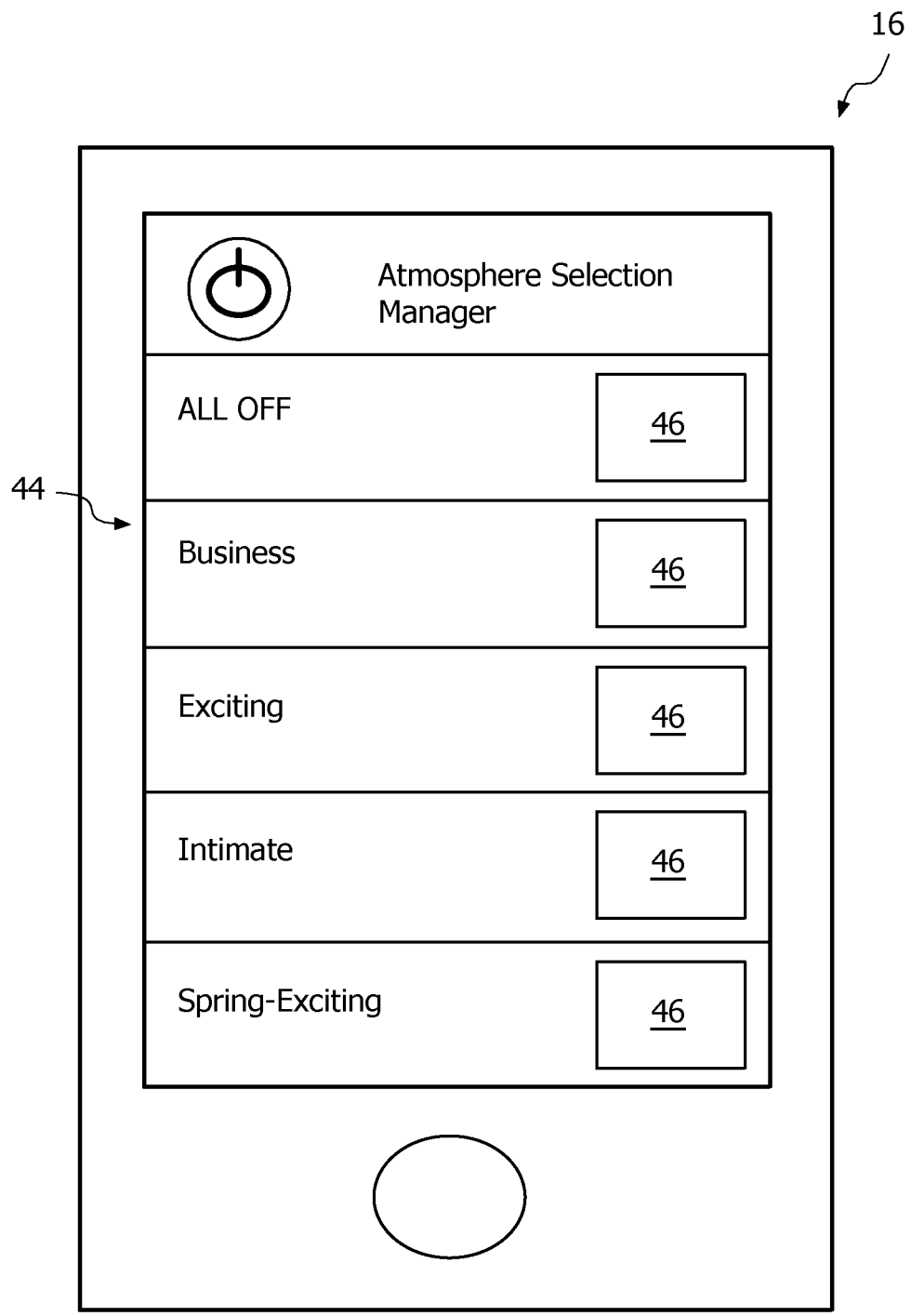
FIG. 3 shows an embodiment of a local user interface of a mobile device serving as a client lighting system controller according to the invention

FIG. 3 shows an example of a local user interface for scene activation on a mobile device, for example a smartphone or a PDA, serving as a client lighting system controller 16. The local user interface may be implemented as a program, which is executed by the mobile device and grants access to the server 12. It contains a list 44 of the scenes with their associated pictures 46 that were made available by the lighting scene management program in the user interface shown in FIG. 2. The local user interface may be dynamically updated. In an implementation this may be also a web-based user interface, where the lighting scene management program on the server may update the user interface. The web user interface may be implemented such that it may be connected to the server 12 via the internet 24 or a local WLAN (Wireless Local Area Network) and may check for example every 2 seconds if an updated web-page with available scenes is available.

If a user selects an entry in the list 44 of the user interface of the client light system controller 16, the controller 16 may transmit a command for example via a local WLAN in the shop to the local lighting system controller 26, which instructs the local lighting system controller 26 to download the selected lighting scene from the server 12 via the internet and to configure the lighting in the shop according to the downloaded lighting scene by controlling the luminaries 28 in accordance with the presets of the downloaded lighting scene. Alternatively, the client lighting system controller 16 may upon selection of an entry in the list 44 download a lighting scene from the server 12 via the internet, and then transmit the downloaded lighting scene to the local lighting system controller 26. Alternatively, the client lighting system controller 16 may upon selection of an entry in the list 44 may instruct the local lighting system controller 26 to activate the already locally available lighting scene selected by the user.

The invention can be applied to all atmosphere creation systems being adapted to create atmospheres such as lighting scenes. Particularly, the invention can be used to centrally control and manage atmosphere creation with different atmosphere creation systems, such as several stores or shops of a retail chain, also stores in stores.

The invention can particularly be applied to create atmosphere in store, where music, sound and fragrance are handeled in the same manner as described above for lighting. Such atmosphere program may contain program for light (as described above), music (in the form of songs or audio-playlists), video (in the form of video or video-playlists) and scent (in the form of a particlular scent or a scent-playlist).

At least some of the functionality of the invention may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an"

does not exclude a plurality. Furthermore, any reference signs in the claims shall not be construed as limiting the scope of the invention.

The invention claimed is:
1. An atmosphere program management system comprising:
   a server, which is remotely accessible via a data connection and stores a plurality of atmosphere programs,
   a remote management client for accessing the server and having a user interface for managing accessibility of the plurality of atmosphere programs stored by the server to a plurality of client atmosphere creation system controllers that are configured to control a plurality of atmosphere creation systems, and
   at least one client atmosphere creation system controller of the plurality of client atmosphere creation system controllers, separate from the remote management client, for accessing the server, and for providing a user interface for selecting an atmosphere program of a first subset of the plurality of atmosphere programs for implementation at a given atmosphere creation system of the plurality of atmosphere creation systems, wherein the given atmosphere creation system is being controlled by the at least one client atmosphere creation system controller and wherein each of the plurality of atmosphere programs are implementable by the given atmosphere creation system;
   wherein the at least one client atmosphere creation system controller downloads, from the server, said first subset of the plurality of atmosphere programs that are accessible for implementation at the given atmosphere creation system,
   wherein the server is configured to execute an atmosphere management program which is adapted to remotely display, at the remote management client, the plurality of atmosphere programs stored by the server, and to enable the remote management client to select said first subset for access by said at least one client atmosphere creation system controller and to exclude a second subset of the plurality of atmosphere programs, which are different from the first subset, from access by the at least one client atmosphere creation system controller, and
   wherein the atmosphere management program is adapted to monitor the effects of implementing at least one atmosphere program of the second subset by the given atmosphere creation system using video data received from a camera device installed proximal to the given atmosphere creation system.

2. The system of claim 1, wherein the atmosphere management program is further adapted to load and remotely display a picture associated with an atmosphere program upon selection of the program.

3. The system of claim 2, wherein the atmosphere management program is further adapted to:
   remotely display installed atmosphere creation systems; and
   allow remotely assigning an atmosphere program to one or more installed atmosphere creation systems by performance of a "drag and drop" operation at the remote management client.

4. The system of claim 1, wherein the atmosphere management program is further adapted to remotely display the received video data.

5. The system of claim 4, wherein the atmosphere management program is further adapted to allow controlling the camera device.

6. The system of claim 1, wherein the atmosphere management program is operable for loading and remotely displaying a picture associated to an atmosphere program upon selection of the program.

7. A lighting scene management system comprising:
   a server, which is remotely accessible via a data connection and stores a plurality of lighting scenes,
   a remote management client for accessing the server and having a user interface for managing accessibility of the lighting scenes stored by the server to a plurality of client lighting system controllers that are configured to control a plurality of lighting systems, and
   at least one client lighting system controller of the plurality of client lighting system controllers, separate from the remote management client, for accessing the server, and for providing a user interface for selecting a lighting scene of a first subset of the plurality of lighting scenes for implementation at a given lighting system of the plurality of lighting systems, wherein the given lighting system is being controlled by the at least one client lighting system controller and wherein each of the plurality of atmosphere programs are implementable by the given lighting system;
   wherein the at least one client lighting system controller downloads, from the server or from the given lighting system, the first subset of the plurality of lighting scenes that are accessible for implementation at the given lighting system,
   wherein the server is configured to execute a lighting scene management program which is adapted to remotely display, at the remote management client, the plurality of lighting scenes stored by the server, and to enable the remote management client to select said first subset for access by said at least one client lighting system controller and to exclude a second subset of the plurality of lighting scenes, which are different from the first subset, from access by the at least one client lighting system controller, and
   wherein the lighting scene management program is adapted to monitor the effects of implementing at least one lighting scene of the second subset by the given lighting system using video data received from a camera device installed proximal to the given lighting system.

8. An atmosphere program management system comprising:
   a server, which is remotely accessible via a data connection and stores a plurality of atmosphere programs;
   a remote management client for accessing the server and having a user interface for managing accessibility of the plurality of atmosphere programs stored by the server to a plurality of client atmosphere creation system controllers that are configured to control a plurality of atmosphere creation systems; and
   at least one client atmosphere creation system controller of the plurality of client atmosphere creation system controllers, separate from the remote management client, for accessing the server, and for providing a user interface for selecting an atmosphere program of a first subset of the plurality of atmosphere programs for implementation at a given atmosphere creation system of the plurality of atmosphere creation systems, wherein the given atmosphere creation system is being controlled by the at least one client atmosphere creation system controller and wherein each of the plurality of atmosphere programs are implementable by the given atmosphere creation system;

wherein the client atmosphere creation system controller downloads, from the server, the first subset of the plurality of atmosphere programs that are accessible for implementation at the given atmosphere creation system, wherein the server is configured to execute an atmosphere management program which is adapted to remotely display, at the remote management client, the plurality of atmosphere programs stored by the server, and to enable the remote management client to select said first subset for access by said at least one client atmosphere creation system controller and to exclude a second subset of the plurality of atmosphere programs, which are different from the first subset, from access by the at least one client atmosphere creation system controller, and wherein the remote management client is configured to control the given atmosphere creation system to implement at least one atmosphere program of the second subset at the given atmosphere creation system.

9. The atmosphere program management system of claim 8, wherein the atmosphere management program is adapted to monitor the effects of implementing the at least one atmosphere program of the second subset by the given atmosphere creation system using video data received from a camera device installed proximal to the given atmosphere creation system.

10. The system of claim 1, wherein each of the plurality of atmosphere programs are implementable by any of the plurality of atmosphere creation systems, wherein the at least one client atmosphere creation system controller is at least one first client atmosphere creation system controller, wherein the remote management client is configured to select a third subset of the plurality of atmosphere programs for access by at least one second client atmosphere creation system controller of the plurality of client atmosphere creation system controllers that is different from said at least one first client atmosphere creation system controller and configured to exclude a fourth subset of the plurality of atmosphere programs, which are different from the third subset, from access by the at least one second client atmosphere creation system controller, wherein the at least one second client atmosphere creation system controller controls a second atmosphere creation system of the plurality of atmosphere creation systems, and wherein the second atmosphere creation system is disposed at a location that is different from and remote from a location at which said given atmosphere creation system is disposed, wherein the atmosphere management program is adapted to monitor the effects of implementing at least one atmosphere program of the fourth subset by the second atmosphere creation system using video data received from a camera device installed proximal to the second atmosphere creation system.

11. The system of claim 7, wherein each of the plurality of lighting scenes are implementable by any of the plurality of lighting systems, wherein the at least one client lighting system controller is at least one first client lighting system controller, wherein the remote management client is configured to select a third subset of the plurality of lighting scenes for access by at least one second client lighting system controller of the plurality of client lighting system controllers that is different from said at least one first client lighting system controller and configured to exclude a fourth subset of the plurality of lighting scenes, which are different from the third subset, from access by the at least one second client lighting system controller, wherein the at least one second client lighting system controller controls a second lighting system of the plurality of lighting systems, and wherein the second lighting system is disposed at a location that is different from and remote from a location at which said given lighting system is disposed, wherein the light scene management program is adapted to monitor the effects of implementing at least one lighting scene of the fourth subset by the second lighting system using video data received from a camera device installed proximal to the second lighting system.

12. The system of claim 9, wherein each of the plurality of atmosphere programs are implementable by any of the plurality of atmosphere creation systems, wherein the at least one client atmosphere creation system controller is at least one first client atmosphere creation system controller, wherein the remote management client is configured to select a third subset of the plurality of atmosphere programs for access by at least one second client atmosphere creation system controller of the plurality of client atmosphere creation system controllers that is different from said at least one first client atmosphere creation system controller and configured to exclude a fourth subset of the plurality of atmosphere programs, which are different from the third subset, from access by the at least one second client atmosphere creation system controller, wherein the at least one second client atmosphere creation system controller controls a second atmosphere creation system of the plurality of atmosphere creation systems, and wherein the second atmosphere creation system is disposed at a location that is different from and remote from a location at which said given atmosphere creation system is disposed, wherein the atmosphere management program is adapted to monitor the effects of implementing at least one atmosphere program of the fourth subset by the second atmosphere creation system using video data received from a camera device installed proximal to the second atmosphere creation system.

\* \* \* \* \*